United States Patent [19]

Mills

[11] 3,815,254

[45] June 11, 1974

[54] METHOD AND APPARATUS FOR CONTROLLING THE AMOUNT OF MOISTURE REMOVED FROM MATERIAL

[76] Inventor: Winslow B. Mills, 2800 Drake Rd., Pensacola, Fla. 32503

[22] Filed: Jan. 18, 1972

[21] Appl. No.: 218,714

[52] U.S. Cl............................ 34/31, 34/28, 34/41, 34/48, 162/252, 162/DIG. 6
[51] Int. Cl.......... D21f 5/06, D21f 5/18, F26b 3/00
[58] Field of Search .......... 162/252, DIG. 6; 34/28, 34/31, 41, 48, 49, 54

[56] References Cited
UNITED STATES PATENTS

| | | | |
|---|---|---|---|
| 1,633,817 | 6/1927 | Klages | 34/41 |
| 1,646,515 | 10/1927 | Witham | 34/41 |
| 3,416,237 | 12/1968 | Sutherland | 34/54 |
| 3,518,775 | 7/1970 | Bartles | 34/48 |
| 2,724,903 | 11/1955 | Ehrisman | 34/49 |

Primary Examiner—S. Leon Bashore
Assistant Examiner—M. Steven Alvo
Attorney, Agent, or Firm—Francis C. Browne

[57] ABSTRACT

In the manufacture of paper wherein the final step is to convey the paper over a series of steam heated drying drums; sensing the temperature and humidity of the air conveyed from the area of the paper through a duct situated over the last number of drums, and controlling the amount of steam admitted to the drums to control the temperature of the drums and ultimately the amount of moisture removed from the paper upon initial start up or heating of the drying means or upon breakage of the sheet of paper during a drying operation.

8 Claims, 3 Drawing Figures

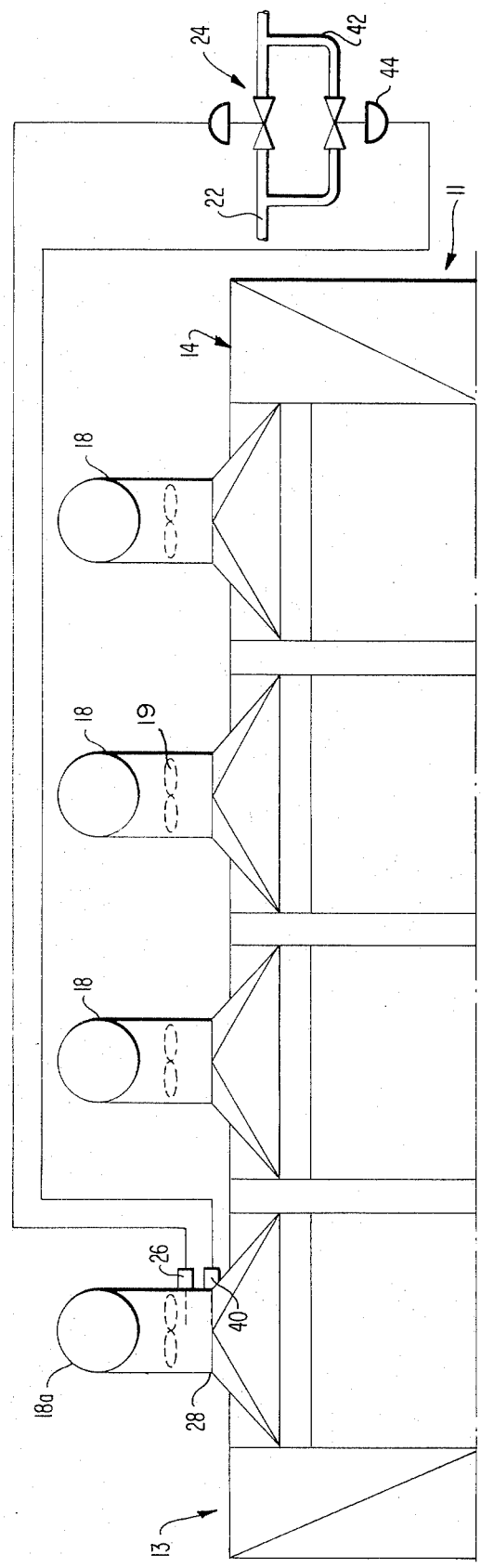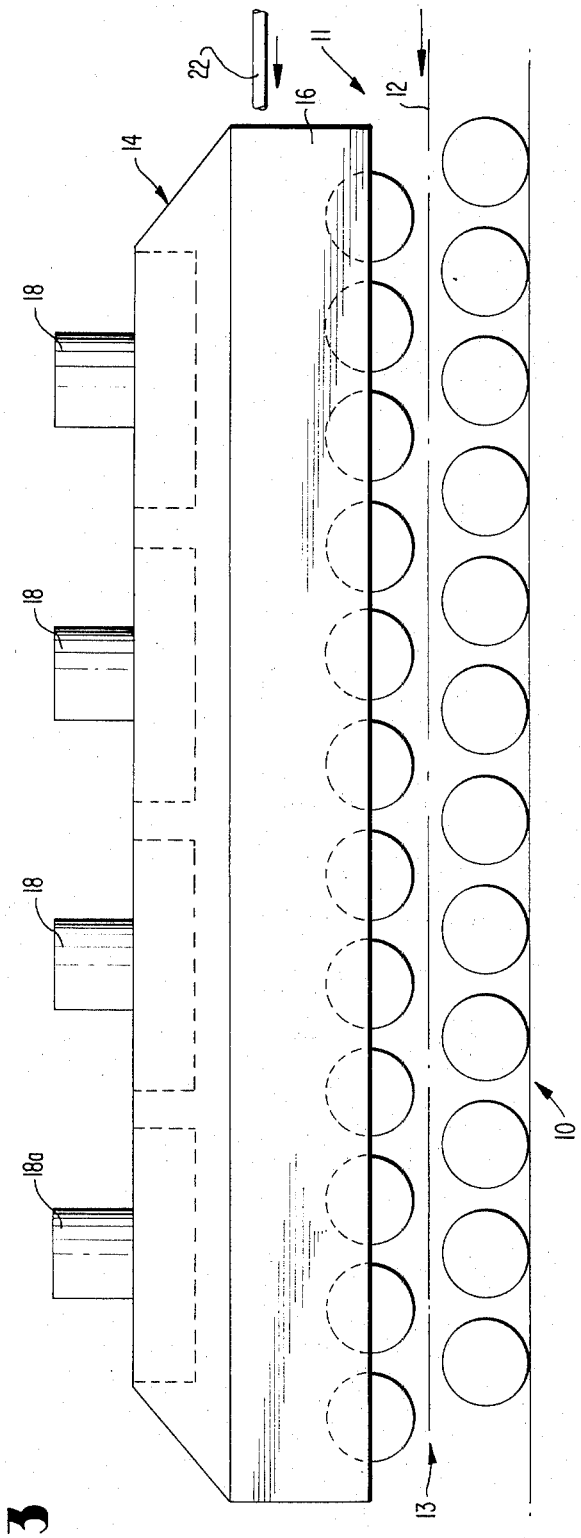

METHOD AND APPARATUS FOR CONTROLLING THE AMOUNT OF MOISTURE REMOVED FROM MATERIAL

SUMMARY OF THE INVENTION

The present invention relates to improved method and apparatus for controlling the removal of moisture from material such as paper after it is formed and during the drying process wherein the newly formed paper is conveyed through a drying area for removing the moisture. Although the invention is illustrated and has particular utility in connection with the manufacture of paper and steam drying drums used to remove the moisture from the paper, the present invention may be applied elsewhere in other environments and therefore is not limited to the specific application described and illustrated.

In drying newly formed paper manufactured from pulp, it is an object to remove only certain amounts of moisture from the paper so that the paper will not be "over-dried" or "under dried." In past attempts to control the temperature of the drying mechanism (which conventionally are steam heated drums), the moisture of the paper at a certain point in its travel would be sensed and the supply of steam to the drums regulated in accordance with the sensed moisture. One example of the foregoing prior art method is illustrated in the U.S. Pat. to Klages No. 1,633,817 wherein the moisture at a small area close to the paper at the intermediate section of the drying drums is sensed to control the steam supply to the drying drums.

The moisture sensed by this prior art method is not believed to be sufficiently accurate or representative of the amount of moisture removed from the paper because in the first place the area sensed is too small. Secondly the location of the area sensed is at the intermediate section of the drying drums and so the sensed moisture does not represent the condition of the paper as it leaves the drying drums. Another drawback with prior art methods such as illustrated in Klages U.S. Pat. No. 1,633,817 is that the temperature and humidity of the ambient atmosphere which has an influence on the temperature of the drying drums, is not taken into account by the sensing control. As a result of the above dificiencies, it has been exceedingly difficult and inefficient to accurately control the amount of moisture removed from the paper.

Accordingly, it is an object of the present invention to provide improved method and apparatus for accurately controlling the removal of moisture from material such as newly manufactured sheet paper. Included herein is the provision of such method and apparatus which will insure that the moisture content of the dried paper will lie in a predetermined acceptable range.

A further object of the present invention is the provision of such a control method and apparatus which may be easily implemented on a commercial basis at low cost and in association with conventional or other drying apparatus.

A still further object of the present invention is to provide such a control method and apparatus which are automatically operable to control the removal of moisture from the material, that is without manual supervision or operation.

The above and other objects are achieved in paper making apparatus including a series of steam heated dryer drums extending through a drying area having a plurality of air exhaust ducts overlying the drums; by placing a temperature sensing device such as wet and dry bulbs in the last exhaust duct which overlies the outlet or "dry" end of the drums to sense the amount of moisture in the air passing through the duct at the outlet end of the drums. The sensing device is connected, through a computer relay and humidity controller, to a control valve which controls the supply of steam to the drums so that when the sensed moisture in the duct is above a predetermined point, the control valve will be opened to admit more steam into the drums, and when the sensed moisture in the duct is below a predetermined point the control valve will be closed to lower the temperature of the drums.

In addition should there be a break in the paper web moving over the drums, the moisture sensed in the last duct will be below the predetermined point thus causing closing of the control valve to lower or stop the amount of steam applied to the drums to thereby reduce the temperature of the drums below a predetermined point. In order to prevent complete cooling of the drums in the event of such a break in the paper so as to continue the drying operation upon reestablishing the flow of paper, a temperature sensing device is placed in the last duct to sense the temperature independently of the moisture. Thus when a break in the paper passing over the last drum occurs, although the decrease in the sensed moisture will cause the control valve to close, when the drums cool to a predetermined point, the temperature sensing device will open a bypass valve associated in parallel with the main control valve to allow steam to be supplied to the drums to bring the temperature of the drums into a predetermined acceptable range for operation.

The temperature sensing device will also employed in initiating the drying operation when all the drying drums are cold. The temperature sensing device in this instance senses that the temperature in the last duct is below the predetermined point and thus causes the bypass valve to open and allow the introduction of steam into the dryer drums to bring the temperature of the drying drums into the operational range.

Other objects and advantages will be apparent from the following detailed description and the attached drawings in which:

FIG. 2 is a plan view of the paper drying apparatus; and

FIG. 3 is a side elevational view of the paper drying apparatus.

DETAILED DESCRIPTION

Figure 1:
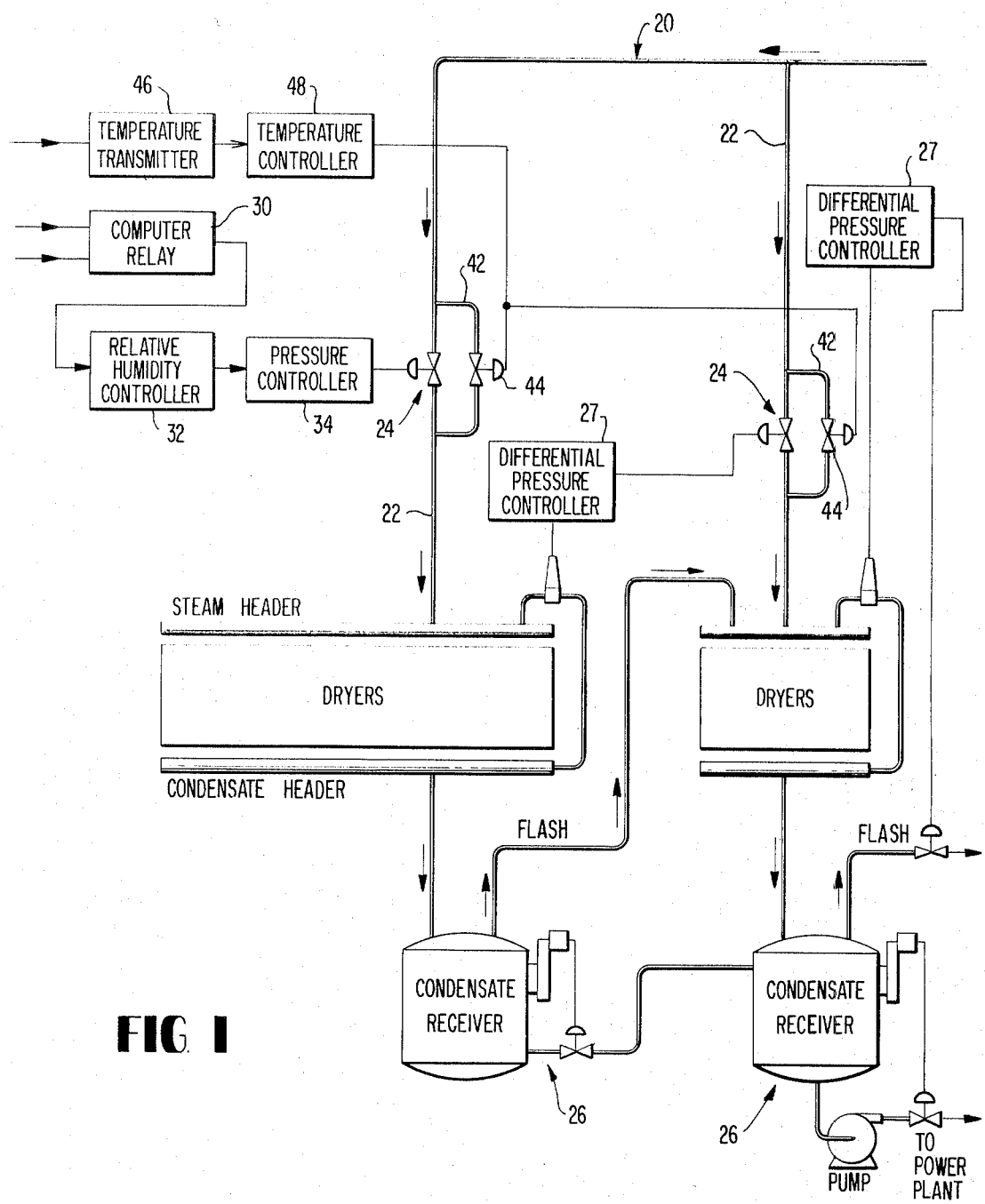
FIG. 1 is a schematic view of a steam destruction system and associated control circuit included in paper drying apparatus in accordance with the present invention.

Referring to the drawings in detail there is illustrated in FIGS. 1 and 2, drying apparatus used in a paper making machine, including a plurality of conventional drying drums 10 situated in series throughout what will be termed a "drying" area. After the paper sheet 12 is formed from the pulp in the portions of the paper making machine (not shown), the paper is conveyed by any conventional means through the drying area over drums 10. As is conventional, drums 10 are heated by steam supplied from a suitable source and conveyed to the drums in a manner to be described.

Overlying the drums in the drying area is an elongated hood 14 whose opposite side and end walls 16 enclose a space overlying the drums. Air is exhausted from the hood by a plurality of exhaust ducts 18 communicating with the area of the hood above the drums. A conventional fan arrangement such as represented by 19 may be provided in each of ducts 18 to force the flow of air outwardly from dryer hood 14 through the ducts for disposal at a suitable location away from the drying area.

It will be apparent that as the paper passes over the drums, the heat from the drums will remove the moisture from the paper, with the moisture mixing in the air which is exhausted from the hood through the various exhaust ducts 18. For purposes of heat control, dryer drums 10 are conventionally divided into several sections each separately controlled. In this way, the temperature of the different drum sections may be maintained at a gradient which for example in a machine making 60 pound basis weight Kraft paper, the temperature of the drums in the first section at the "inlet" or "wet end" 11 of the drying apparatus is approximately 300°F. or less, and the temperature of the drums at the "outlet" or "dry end" 13 is approximately 350°F.

Referring to FIG. 1 in the shown embodiment, the steam is supplied from a suitable source to a main header line 20 from which branch four supply conduits 22 (only two shown) leading to the four drum sections (only two shown) respectively. In addition, a conventional system generally designated 26 including pressure differential control 27, is employed to return the condensate to the drum sections and the steam source to obtain a desired temperature gradient across the drums as described above.

In accordance with the present invention, the humidity of the air at outlet end 13 of the drums is sensed to control valve 24 in the associated supply conduit 22 and consequently the temperature of the drums at the outlet 13.

This control is achieved through a moisture sensing device 26 placed in the last exhaust duct 18a preferably in the throat area 28 thereof. The moisture sensing device 26 per se may be conventional and include wet and dry bulbs. The signal from the moisture sensing device is conveyed to the associated control valve 24 to open or close or regulate the position of the valve to increase or decrease the flow of steam to the drums and ultimately control the temperature of the drums in order to control the amount of moisture removed from the paper. In the form shown, the signal from the moisture sensing device 26 is first conveyed to a computer relay 30 which in turn sends a signal to a relative humidity controller 32 which in turn operates a pressure controller 34 controlling the air or other pressure which is employed to actuate the control valve. Computer relay 30 receives two signals, one being the dry bulb temperature and the other being the wet bulb temperature. These two signals are computed into relative humidity within the instrument and relayed to the relative humidity controller in terms of a 3 to 15 psi air signal.

The signal received from the computer relay is transmitted into relative humidity and controlled within preset limits set on the controller 32. The relative humidity controller 32 either indicates or records the humidity and relays the increasing or decreasing signal to the pressure controller which operated the primary steam admission valve to the dryers. Computer relay 30, relative humidity controller 32, and pressure controller 34 per se may be conventional items and therefore require no further explanation.

In operation, assuming that the paper 12 is passing over the drums and the proper amount of moisture is being removed from the paper, moisture sensing device 26 will not send a signal to change the position of control valve 24. If, however, insufficient moisture is being removed from the paper, when the paper reaches the outlet end 13, the excess moisture in the paper will be reflected in the moisture in the air flowing through the last exhaust duct 18a which will be sensed by device 26. An appropriate signal will be sent through the computer relay 30 relative humidity controller 32 and pressure controller 34 to control valve 24 to open or further open the control valve 24 to admit more steam into the drums to remove more moisture from the paper.

If on the other hand, too mucn moisture is being removed from the paper by the drums, the paper moving through the outlet or dry end 13 will be too dry and the sensing device will sense this condition as it is reflected through the low moisture of the air exhausted through the last exhaust duct 18a. This will energize the control system so that the control valve 24 will close or move further towards closed position to stop or decrease the flow of steam into the drums to insure that the proper amount of moisture will be removed from the paper. The same result will obtain if there should be a break in the paper passing over the drums because in such instance, air passing through the last duct 18a will reflect a decrease in moisture due to the break in the paper, and sensing device 26 will energize the control system as in the above case to regulate or stop the flow of stream to lower the temperature of the drums until the flow of paper is reestablished.

In order to prevent excess cooling of the drums in the event of a break in the paper, a temperature responsive sensing element 40 is also placed in last duct 18a, preferably in the throat area 28, to sense the temperature in the air passing through this duct. A bypass line 42 bypassing the primary control valve 24 is provided in each of the supply conduits 22 and a bypass control valve 44 is placed in each of the bypass lines 42. Bypass control valves 44 are operated through a control circuit which includes the temperature sensing element 40, and a temperature transmitter 46 and a temperature controller 48 which convert the signal from the temperature sensing element to operate the bypass control valves 44 in accordance with the temperature of the air passing through the last duct. Temperature transmitter 46 receives the signal from the temperature bulb placed in the exhaust duct in terms of temperature. The signal received is transmitted into a 3 to 15 psi air signal and relayed to the temperature controller.

Temperature controller 48 receives its signal from the temperature transmitter in terms of 3 to 15 psi air. The range of temperature desired in the duct is set on the temperature controller 48. As the signal received decreases to 3 psi, the outgoing signal to the steam valve 44 increases to open the valve. As the signal received increases, meaning the temperature in the duct is rising, the signal to the valve decreases, closing the valve. The controller 48 maintains the temperature in the duct that is preset.

In operation and assuming a break in the paper occurs, moisture sensing device 26 will regulate the main control valve 24 to decrease the temperature in the drums. However when the drum temperature falls below a predetermined point say 120°F., this will be sensed by temperature sensing element 40 and a signal will be sent to the bypass control valves 44 to open the bypass control valves 44 and admit steam into the drums for maintaining the temperature of the drums at operational level for subsequent operation upon reestablishing the flow of paper through the drums. When the temperature in the drums rises say above 130°F., the temperature controller 48 will energize bypass valves 44 to closed position to insure that the temperature of the drums will at least be in a desired range governed by the setting of the temperature controller 48.

In addition to the above function, the temperature control circuit is employed to raise the temperature of the drums when the apparatus is initially started. This is effected by the temperature sensing element which senses the temperature of the air passing through the last duct 18a as being below a predetermined point. A signal is then conveyed to bypass valves 44 opening and regulating them to admit sufficient steam into the drums to raise the temperature of the drums to the proper operational level.

It will thus be seen that the temperature of the drums is regulated by the moisture sensing device and the temperature sensing element acting independently of each other, so that the temperature of the drums will remain in a predetermined range necessary to insure removal of the desired amount of moisture from the paper. It will be further apparent that the control system of the present invention will also account for the temperature and humidity of the ambient atmosphere. Thus ambient atmosphere causing the drums to cool and produce less moisture, would be sensed by the control system to admit more steam to the drums. The opposite condition would also be sensed and corrected by the control system.

Modifications and adaptations of the present invention readily apparent from the foregoing description and associated drawings, although not specifically mentioned herein, will nevertheless be included within the scope of the present invention as indicated in the appended claims.

I claim:

1. In apparatus for drying material such as sheet paper including a drying area having drying means for drying the material as it is conveyed through the drying area in close proximity to the drying means, having an inlet area through which the material initially passes and an outlet area from which the material emerges from the drying means, said drying means including a plurality of drums spaced throughout the drying area between the inlet and outlet areas, a number of exhaust ducts located adjacent to but spaced from the drying means to convey the moisture removed from the material away from the drying area, one of said ducts being located at the outlet area, containing means to draw air into duct, and having an inlet spanning a distance extending transversely over a plurality of drums, said one duct having a throat area of reduced size in comparison to said inlet area thereof through which the exhaust air passes after leaving said inlet area of said duct, means for controlling the temperature of the drying means for controlling the amount of moisture removed from the material comprising in combination, heating means for heating said drying means, a first control means for controlling the amount of heat imparted to said drying means by said heating means, and moisture sensing means located in said throat area of said one duct at the outlet area and connected to said first control means for sensing the moisture removed from the material as it passes through the outlet area and through said one duct for regulating said first control means to increase the amount of heat imparted to said drying means when the sensed moisture is above a predetermined range and to decrease the amount of heat imparted to said drying means when the sensed moisture is below a predetermined range.

2. The combination defined in claim 1 wherein said drying means includes a plurality of drums arranged in series in the drying area, said heating means including a source of steam, and supply conduit interconnecting the source of steam and said drums, and wherein said first control means includes a control valve means in said supply conduit operable in response to said sensing means to open or close said conduit depending on the moisture sensed in said one duct.

3. The combination defined in claim 1 further including a computer relay connected to said sensing device to receive signals therefrom in accordance with the moisture sensed, a humidity controller connected to said computer relay to receive signals therefrom in accordance with the moisture sensed, and a control valve means operable in response to signals from the humidity controller.

4. In the art of drying moist sheet material by passing it through a heated area having an inlet and an outlet to remove moisture from the sheet material, and sensing the amount of moisture removed from the material to control the temperature of the heated area and consequently the amount of moisture removed from the sheet material; and method comprising the steps of; sensing the moisture content in the air at the outlet of the heated area to determine the moisture condition of the material as it passes through the outlet, controlling the temperature of the heated area in accordance with the sensed moisture condition to consequently control the amount of moisture removed from the sheet material during the heating operation, sensing the temperature of the air at said outlet independently of said moisture sensing step and controlling the temperature of the heated area in accordance with the sensed temperature and independently of the sensed moisture condition for regulating the temperature of said drying means upon initial start up or heating of the drying means or upon breakage of the sheet material during a drying operation.

5. The method defined in claim 4 wherein an exhaust duct is placed at the outlet of the heated area and the air including the moisture removed from the sheet material at the outlet area is caused to pass through said duct and wherein the moisture of the air passing through the duct is sensed in said duct and further wherein the temperature of the air passing through said duct is sensed in said duct.

6. In apparatus for drying material such as sheet paper including a drying area having drying means for drying the material as it is conveyed through the drying area in close proximity to the drying means, the drying means having an inlet area through which the material initially passes and an outlet area from which the material emerges from the drying means, a number of exhaust ducts located adjacent the drying means to convey the moisture removed from the material away from the drying area, one of said ducts being located at the outlet area, means for controlling the temperature of the drying means for controlling the amount of moisture removed from the material comprising in combination; heating means for heating said drying means, a first control means for controlling the amount of heat imparted to said drying means by said heating means, and moisture sensing means located in said one duct at the outlet area and connected to said first control means for sensing the moisture removed from the material as it passes through the outlet area for regulating said first control means to increase the amount of heat imparted to said drying means when the sensed moisture is above a predetermined range and to decrease the amount of heat imparted to said drying means when the sensed moisture is below a predetermined range, and wherein there is further included, temperature sensing means independent of said moisture sensing means and being located in said one duct for sensing the temperature of the air passing through said duct and consequently the temperature of said drying means, and a second control means independent of said first control means and connected to said temperature sensing means for controlling the amount of heat imparted to said drying means by said heating means in accordance with the sensed temperature for regulating the temperature of said drying means in a predetermined range independently of said moisture sensing means upon initial start up or heating of said drying means or upon breakage of the sheet of paper during a drying operation.

7. In apparatus for drying material such as sheet paper including a drying area having drying means for drying the material as it is conveyed through the drying area in close proximity to the drying means, the drying means having an inlet area through which the material intially passes and an outlet area from which the material emerges from the drying means, a number of exhaust ducts located adjacent the drying means to convey the moisture removed from the material away from the drying area, one of said ducts being located at the outlet area, means for controlling the temperature of the drying means for controlling the amount of moisture removed from the material comprising in combination, heating means for heating said drying means, a first control means for controlling the amount of heat imparted to said drying means by said heating means, and moisture sensing means located in said one duct at the outlet area and connected to said first control means for sensing the moisture removed from the material as it passes through the outlet area for regulating said first control means to increase the amount of heat imparted to said drying means when the sensed moisture is above a predetermined range and to decrease the amount of heat imparted to said drying means when the sensed moisture is below a predetermined range, and wherein said drying means includes a plurality of drums arranged in series in the drying area, said heating means including a source of steam and a supply conduit interconnecting the source of steam and said drums, and wherein said first control means includes a control valve means in said supply conduit operable in response to said sensing means to open or close said conduit depending on the moisture sensed in said one duct, and wherein there is further included temperature sensing means independent of said moisture sensing means and being located in said one duct for sensing the temperature of the air passing through said one duct and consequently the temperature of said drying means, said heating means including a second steam conduit interconnecting the source of steam and said drums, a second control means independent of said first control means and being connected to said temperature sensing means for controlling the amount of heat imparted to said drums by said heating means in accordance with the sensed temperature for regulating the temperature of said drying means in a predetermined range upon initial start up or heating of the drying means or upon breakage of the sheet of paper during a drying operation, said second control means including a second control valve means located in said second conduit and being operable in response to said temperature sensing means to open or close said second conduit depending on the temperature sensed in said one duct.

8. The combination defined in claim 7 further including a computer relay connected to said moisture sensing device to receive signals therefrom in accordance with the moisture sensed, a humidity controller connected to said computer relay to receive signals therefrom in accordance with the moisture sensed, and pressure control means connected and operable in response to said humidity controller and being connected to said first control valve means to control the same.

* * * * *